United States Patent [19]

Broadway et al.

[11] 4,013,909
[45] Mar. 22, 1977

[54] ELECTRIC MOTORS

[75] Inventors: Alexander Richard William Broadway; William Fong, both of Westbury-on-Trym; Gordon Hindle Rawcliffe, Bristol, all of England

[73] Assignee: National Research Development Corporation, England

[22] Filed: May 6, 1975

[21] Appl. No.: 575,044

Related U.S. Application Data

[63] Continuation of Ser. No. 410,353, Oct. 29, 1973.

[30] Foreign Application Priority Data

Nov. 3, 1972 United Kingdom .............. 50832/72

[52] U.S. Cl. .................. 310/180; 310/198; 310/202; 318/224 R
[51] Int. Cl.² ........................................ H02K 3/00
[58] Field of Search .......... 310/179, 180, 184, 188, 310/195, 198, 200–208; 318/224, 225, 523, 525

[56] References Cited

UNITED STATES PATENTS

| 3,197,686 | 7/1965 | Rawcliffe | 318/224 |
|---|---|---|---|
| 3,233,159 | 2/1966 | Rawcliffe | 318/224 |
| 3,299,337 | 1/1967 | Rawcliffe | 318/224 |
| 3,335,307 | 8/1967 | Levy | 310/202 |
| 3,432,707 | 3/1969 | Peters | 310/180 |
| 3,476,964 | 11/1969 | Willyoung | 310/198 |
| 3,515,922 | 6/1970 | Fong | 310/198 |
| 3,622,823 | 11/1971 | Broadway | 310/179 |
| 3,673,477 | 6/1972 | Broadway | 310/202 |
| 3,794,870 | 2/1974 | Broadway | 310/180 |

FOREIGN PATENTS OR APPLICATIONS

1,133,062 11/1968 United Kingdom .............. 310/198

Primary Examiner—R. Skudy
Attorney, Agent, or Firm—Larson, Taylor and Hinds

[57] ABSTRACT

A pole-amplitude modulation type, speed-changing, 3-phase alternating current electric motor or generator having a composite stator winding comprising two 3-phase winding components. The 3-phase winding components are in themselves pole-amplitude modulation pole-changing, 3-phase windings, but may possess unsuitable electrical characteristics for practical use. The two components are combined the first component being wound on the first half of the stator and the second component being wound on the second half of the stator whereby the composite stator winding is given acceptable electrical characteristics, particularly in respect of harmonic content, or sub-harmonic content, of MMF waveform.

4 Claims, 7 Drawing Figures

COIL-PITCH: 3 SLOTS (1-4 ETC.)

POSITIVE-SEQUENCE
A B C
6-POLE & 10-POLE

RELATIVE SHIFT
3 SLOTS

NEGATIVE-SEQUENCE
A C B
10-POLE ONLY

RESULTANT C

COIL-PITCH: 6 SLOTS (1-7 ETC.)

ELECTRIC MOTORS

This is a continuation of application Ser. No. 410,353 filed Oct. 29, 1973.

This invention relates to 3-phase, alternating current, speed-changing electric motors and generators, in which speed-changing is effected by the method of pole-amplitude modulation, (PAM).

The method of speed-changing by pole-amplitude modulation has been described in papers by Professor G. H. Rawcliffe and others, the first entitled "Induction Motor Speed-Changing by Pole-Amplitude Modulation" in the Proceedings of The Institution of Electrical Engineers, Vol. 105, Part A, No. 22, August 1958 and a second entitled "Speed-Changing Induction Motors — Further Developments in Pole-Amplitude Modulation" in the Proceedings of The Institution of Electrical Engineers, Vol. 107, Part A, No. 36, December, 1960.

The method has been further described and defined in U.S. Pat. Nos. 3,233,159; 3,197,686; 3,175,142; 3,175,143; 3,175,144; 3,299,337; 3,673,477; and 3,794,870.

The object of the present invention is to provide machines of the PAM type in which the MMF harmonic content is reduced by use of two, component, 3 phase windings.

It is known, for example from U.K. patent No. 1,133,062, to provide a 3-phase machine having a stator winding comprising three similar winding components, each component itself comprising three phase-windings and each component by itself being suitable for use as the stator winding of a 3-phase machine, even though the component winding might not be satisfactory in respect of their balance between pulse. In that specification the composite stator windings described were assembled by arranging a particular phase-winding of the component winding to be in phase A for the first component, phase B for the second component and phase C for the third component. The resultant composite winding was thus exactly balanced with respect to all three phase-windings, and provided the original alternative pole-numbers.

The present invention is distinguished by a composite 3-phase stator winding comprising two component windings the first component being wound on the first half of the stator and the second component being wound on the second half of the stator, to form a composite winding which gives twice the number of poles, compared with the two alternative pole - numbers of the component windings.

In order that the invention may be readily carried into practice, a number of embodiments thereof will now be described in detail, by way of example, with reference to the accompanying drawings, in which.

Figure 1:
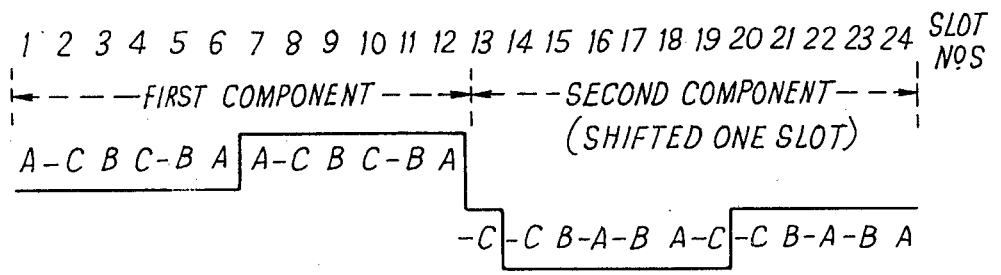
FIG. 1 shows a 3-phase, 8-pole/12-pole PAM winding wound on a 24-slot stator.

In the invention of U.K. patent No. 1,133,062, from which the present invention is distinguished, a balanced 3-phase winding was devised by combining three, 3-phase component windings having corresponding phase-windings in each of the three phases of the resultant winding.

The resultant winding was necessarily exactly balanced, because each phase-winding of the resultant combined the same three component winding parts.

The arrangement there described doubles the slot-number of the winding, but leaves the alternative pole-numbers unchanged. The arrangement now to be described doubles the slot-number of the winding and doubles the pole-number for both alternative pole-numbers.

An example will now be described with reference to FIG. 1, which shows the derivation, from two 12-slot component windings, of the 24-slot winding.

A basic 4-pole/6-pole PAM winding component in 12 slots, using 2 half-cycle "difference" modulation, in the manner described in prior publications relating to PAM windings, using the slot-vector star method, can readily be devised. Such a 4-pole/6-pole winding component is shown in FIG. 1, occupying all 12 slots numbered-12 of the first half of a 24-slot stator. A second identical winding is shown occupying all 12 slots numbered 13–24, of the second half of the stator, phase-retarded by one slot, so that the coils of slots 1–12 correspond to the coils of slots 14–24 and slot 13 respectively. The phases A, C and B of the first component correspond respectively to phases C, B and A of the second component, with reversal of signs throughout.

The 8-pole layout of the resultant winding is shown below the two components, with the current-sense reversal for 12-pole working shown by the resultant 4-half-cycle modulation wave M.

The 12-slot component windings are exactly balanced for 4-pole working, for which the spread (layer) factor is 0.866. For 6-pole working, the positive-sequence, negative-sequence and zero-sequence spread factors are 0.879, 0.063 and 0.236, respectively.

The 24-slot resultant winding is correspondingly balanced for 8-pole working and the 8-pole spread factor is similarly 0.866. For 12-pole working, the reduction factors respectively to be applied to the positive-sequence, negative-sequence and zero-sequence components are 0.966, 0.259 and 0.707. The negative-sequence component for 6 poles, initially small, is further reduced. The 12-pole positive-sequence, negative-sequence and zero-sequence spread factors are 0.848, 0.0163 and 0.167, respectively.

Figure 2:
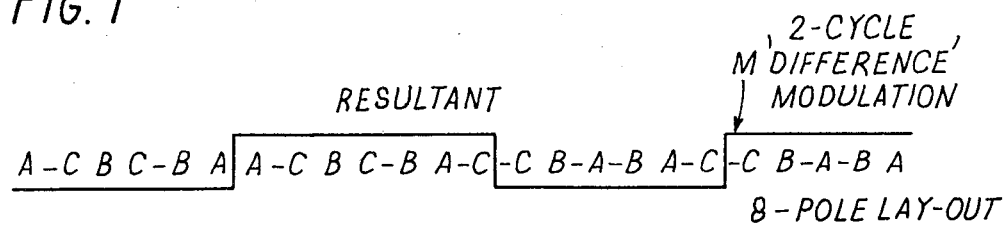
FIG. 2 is a 12-pole vector diagram for the 8-pole/12-pole winding of FIG. 1.
Figure 2:
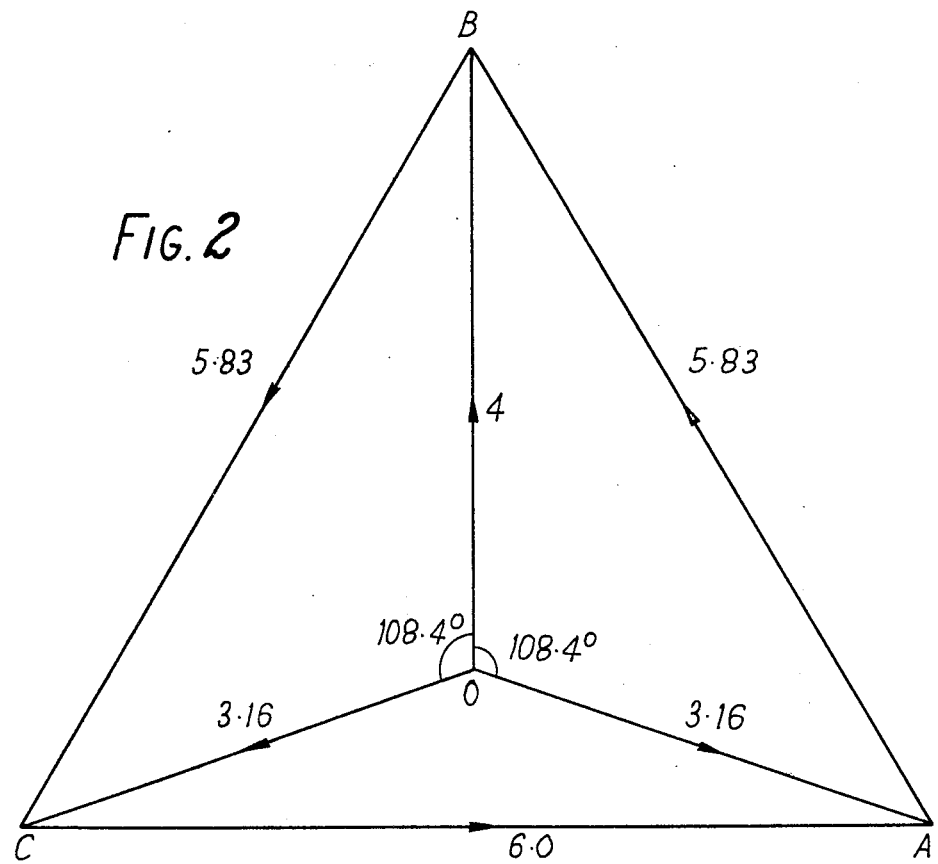

The resultant 8-pole/12-pole winding in 24 slots is thus nearly balanced, apart from the 12-pole, zero-sequence component, as shown in the 12-pole vector diagram of FIG. 2.

When the winding is connected in parallel-star/series-star for the alternative pole-numbers, there is only very small current unbalance, because the zero-sequence component is not significant in star-connection, a matter which is discussed more fully later herein.

Figure 3:
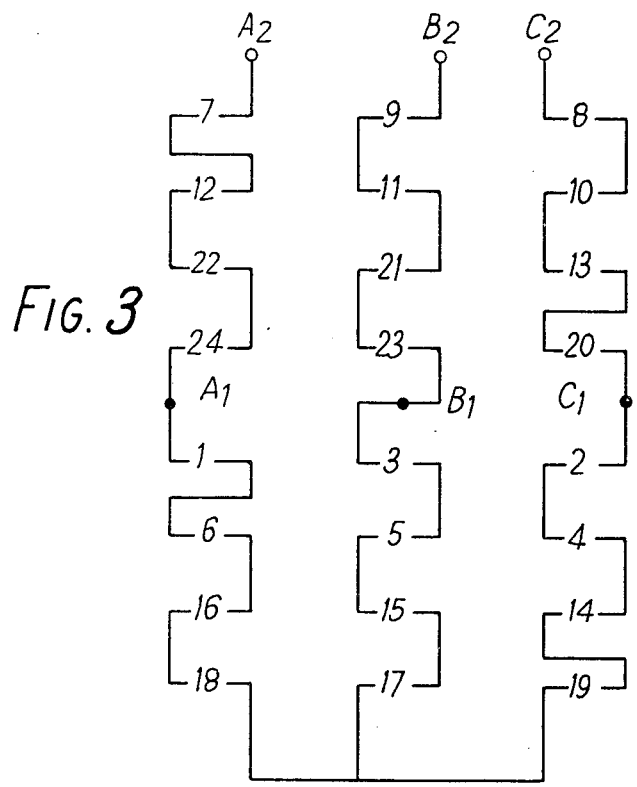
FIG. 3 is a winding diagram of the 8-pole/12-pole winding of FIG. 1.

The winding diagram, for the resultant 24-slot winding of FIG. 1, is shown in FIG. 3. The coil pitch is 3 slots, slot 1 to slot 4 and so on. For 8-pole working the phase-windings are connected in parallel-star by joining together terminals A2, B2 and C2, shown, and supplying terminals A1, B1 and C1. For 12-pole working, the phase windings are connected in series-star, by isolating terminals A1, B1 and C1 and by supplying terminals A2, B2 and C2.

The winding factor for 8-poles is 0.866; the winding factor for 12-poles is 0.601. The 8-pole/12-pole flux density ratio is 0.92. The direction of rotation is the same for both pole-numbers, with the same sequence of supply voltage.

A second example of combining two component windings in sequence on the two half-perimeters of the stator, is given by a 12-pole/20-pole winding on a 144-slot stator, combining two 6-pole/10-pole component windings in 72 slots, to reduce an undesired negative-sequence component in the 72-slot component windings.

Such a 6-pole 72-slot/10-pole component winding is balanced for 6-pole working but has above 2.0% negative-sequence fundamental m.m.f. for 10-pole working. Such residual negative-sequence component for 10 poles is a well-known problem in the design of a 6-pole/10-pole winding and 1.0% has been regarded as the maximum value to be tolerated.

Two such 72-slot component windings are combined on a 144-slot stator, the first component occupying the first 72 slots thereof. The second component winding occupies the second 72 slots, is phase retarded by 3 slots and has phases A, B and C of the first component corresponding to phases C, A and B, respectively, of the second component. The 3 slot phase-retardation corresponds to 45° electrical for 6 poles and 70° electrical for 10 poles. By the phase changes stated, and by sign reversal of the second component phases, the two component windings are out of phase by only 15° for both pole-numbers, 60° shift being the ideal value. The phase-sequence is ABC for both pole-numbers and both the 6-pole positive-sequence and 10-pole positive-sequence e.m.f.'s are reduced by the factor cos 7.5°, that is 0.991.

The resultant 20-pole negative-sequence component is reduced to about 0.85% and a very satisfactory 12-pole/20-pole winding is provided.

The 6-pole e.m.f. is exactly balanced and there is no 12-pole negative-sequence component in the resultant.

Figure 4A:
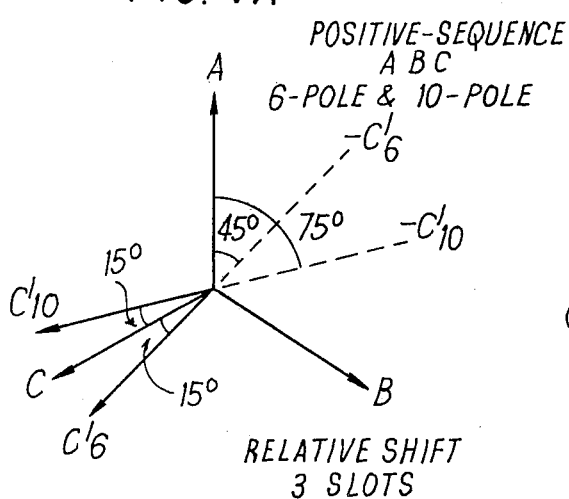
FIGS. 4A and 4B are vector diagrams showing, respectively, the positive-sequence ABC and the negative-sequence ACB for a 3-phase, 12-pole/20-pole PAM winding on a 144-slot stator.
Figure 4B:
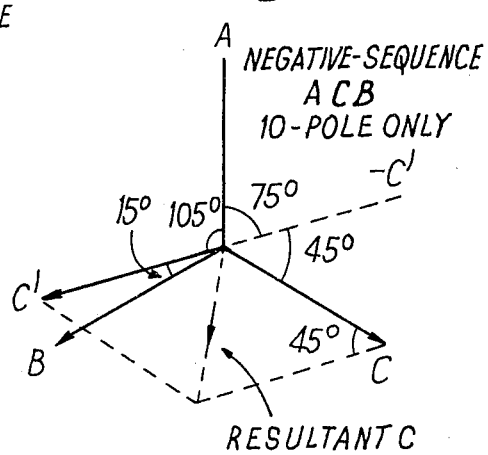

This combination is shown by the two vector diagrams of FIG. 4A and FIG. 4B.

A further matter is to be considered in the design of resultant windings by this mode of combination. For example, a 3-phase, 8-pole/10-pole PAM winding in 36 slots may be designed having the coil-grouping 1 - 2 - 2 - 1 - - 1 - 2 - 2 - 1 per phase.

An alternative winding has the coil-grouping 2 - 2 - 2 - 0 - - 2 - 2 - 2 - 0 per phase and therefore has different characteristics.

In the combination of two 8-pole/10-pole component windings in 36 slots to provide a 16-pole/20-pole winding on a 72-slot stator, it does not follow that the same component winding must be used twice. One component winding of each form may be used thus combining the different characteristics of the two components as well as the advantages in the combination as such.

From the foregoing description, it may be seen that there are two different design procedures which will give identically the same resultant winding by the combination of two component windings.

Figure 5:
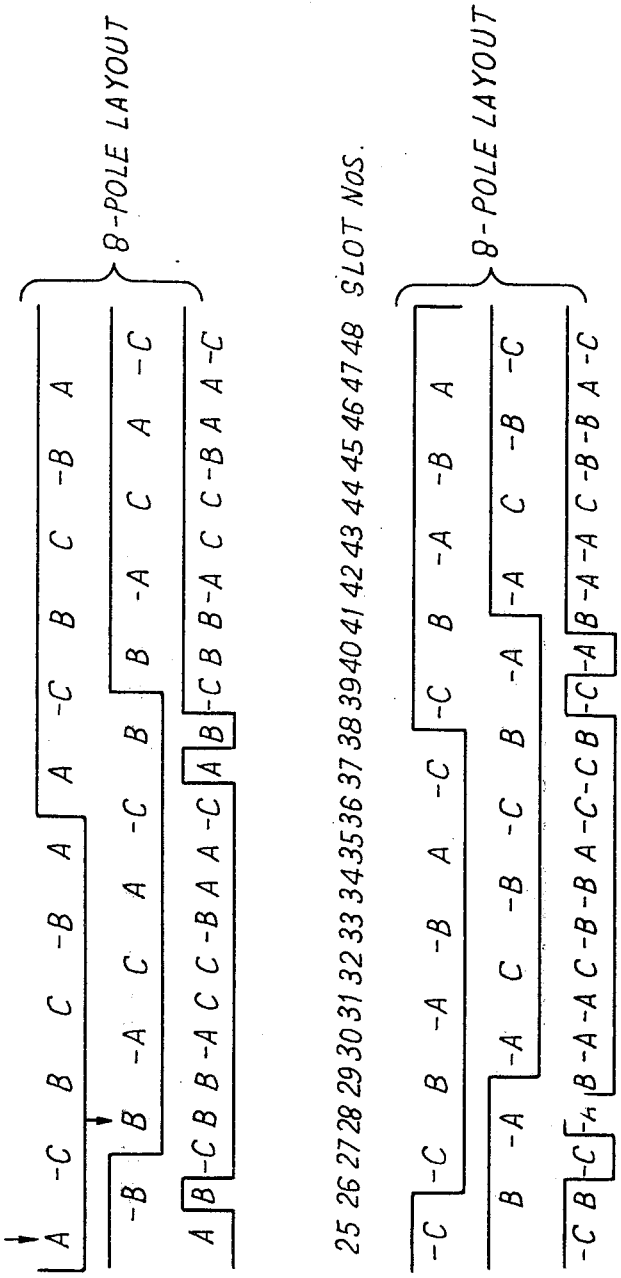
FIG. 5 is a diagram showing a 3-phase, 8-pole/12-pole PAM winding on a 48-slot stator.
Figure 6:
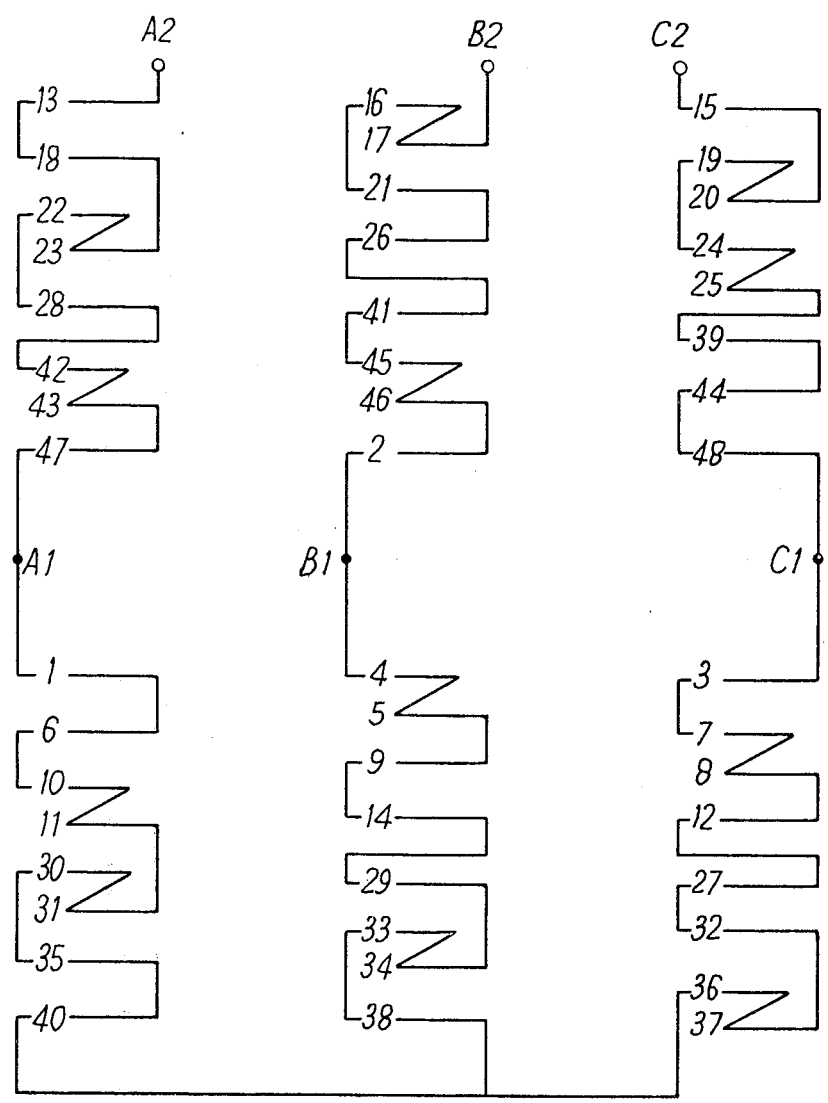
FIG. 6 is a winding diagram of a 3-phase, 8-pole/12-pole, PAM winding on a 48-slot stator.

An example may be given in the design of an 8-pole/12-pole PAM winding on a 48-slot stator as shown in FIGS. 5 and 6; by combining two 24-slot component windings as follows:

Procedure I

1. Design a 4-pole/6-pole PAM winding element in 12 slots by the slot-vector star method known from prior publications.
2. Combine two such 12-slot component windings in the two half-perimeters of a 24-slot stator, with phase-rotation by one slot to give an 8-pole/12-pole winding; and
3. Interleave two such 24-slot windings in alternate slots of a 48-slot stator, with displacement by 3 slots and with phase rotation, to provide a resultant 8-pole/12-pole winding.

Procedure II

1. Design a 4-pole/6-pole PAM winding element in 8 slots by the slot-vector star method;
2. Symmetrise three such 8-slot components at ± 2 slots spacing to provide a 4-pole/6-pole PAM winding in 24 slots. This 24-slot winding is unacceptably out-of-balance for 6 poles, having a substantial negative-sequence component and a zero-sequence component, also;
3. Combine two such 24-slot component windings on successive half-perimeters of a 48-slot stator, with phase shift by 2 slots, to provide an 8-pole/12-pole resultant winding having a much reduced negative-sequence component.

The 8-pole/12-pole PAM winding on a 48-slot stator, shown in FIG. 5 and FIG. 6 may be regarded as the consequence of either of the procedures described above, is shown in FIG. 7.

It will be particularly noted that the step of combining two component windings in the two half-perimeters of the stator, thereby doubling the slot-number and doubling the alternative pole-numbers of the components, appears as Step 2 of Procedure 1 and as Step 3 of Procedure 2.

The coil pitch is 6 slots, slot 1 to slot 7 and so on throughout.

The 8-pole connection is by parallel-star connection of the phase-windings. To this end, terminals A2, B2 and C2 are joined together and terminals A1, B1 and C1 are supplied.

The 12-pole connection is by series-star connection of the phase-windings. To this end, terminals A1, B1 and C1 are isolated and terminals A2, B2 and C2 are supplied.

The 8-pole winding factor is 0.837; the 12-pole winding factor is 0.60. The 8-pole/12-pole flux density ratio is 0.96. The direction of rotation is the same for both pole-numbers, for the same supply voltage sequence.

What we claim is:

1. A 3-phase alternating-current, speed-changing electric machine of the pole-amplitude modulation type, having a composite 3-phase stator winding consisting solely of two 3-phase winding components providing alternative first and second pole-numbers, the said two components being combined as said composite stator winding, the first in a first half-perimeter of the machine stator and the second in the second half-perimeter of the machine stator, said composite winding providing alternative pole-numbers respectively equal to double the said first and second pole-numbers of said components.

2. A 3-phase alternating current electric machine as claimed in claim 1, in which the component phase-windings are balanced between phases whereby the composite winding provides an MMF waveform having a harmonic content lower than that of the component windings.

3. A 3-phase alternating current, speed-changing electric machine as claimed in claim 1, wherein said components are combined in said composite winding with corresponding component phase-windings connected in different phases of the composite windings.

4. A 3-phase alternating-current, speed-changing electric machine of the pole-amplitude modulation type, having a composite 3-phase stator winding consisting of two 3-phase winding components providing alternative first and second pole-numbers, the said two components being combined as said composite stator winding, the first in a first half-perimeter of the machine stator and the second in the second half-perimeter of the machine stator, said composite winding providing alternative pole-numbers respectively equal to double the said first and second pole-numbers of said components, wherein said components are combined in said composite winding, one component being phase-retarded by an integral number of stator slots relatively to the other component.

* * * * *